US009594430B2

(12) United States Patent
Al-Ghosien et al.

(10) Patent No.: US 9,594,430 B2
(45) Date of Patent: Mar. 14, 2017

(54) THREE-DIMENSIONAL FOREGROUND SELECTION FOR VISION SYSTEM

(75) Inventors: Momin Al-Ghosien, Sammamish, WA (US); Craig Peeper, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 602 days.

(21) Appl. No.: 13/151,050

(22) Filed: Jun. 1, 2011

(65) Prior Publication Data

US 2012/0306735 A1 Dec. 6, 2012

(51) Int. Cl.
*G06F 17/00* (2006.01)
*G06F 3/01* (2006.01)

(52) U.S. Cl.
CPC .................................. *G06F 3/017* (2013.01)

(58) Field of Classification Search
CPC . G06F 3/01; G06F 3/011; G06F 3/017; G06F 3/048; G06F 3/04815
USPC ........ 345/418–422, 473–474, 581–582, 606; 348/42, 51, 169–172; 382/103, 106–107, 382/154, 173–174
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |

(Continued)

FOREIGN PATENT DOCUMENTS

| CN | 201254344 B | 6/2010 |
| EP | 0583061 A2 | 2/1994 |

(Continued)

OTHER PUBLICATIONS

Moeslund, Thomas B. et al., "A Survey of Advances in Vision-Based Human Motion Capture and Analysis," Computer Vision and Image Understanding, vol. 104, pp. 90-126, Oct. 2006, 37 pages.

(Continued)

*Primary Examiner* — Alexander Eisen
*Assistant Examiner* — Nelson Law
(74) *Attorney, Agent, or Firm* — Alleman Hall McCoy Russell & Tuttle LLP

(57) ABSTRACT

A method for controlling a computer system includes acquiring video of a subject, and obtaining from the video a time-resolved sequence of depth maps. An area targeting motion is selected from each depth map in the sequence. Then, a section of the depth map bounded by the area and lying in front of a plane is selected. This section of the depth map is used for fitting a geometric model of the subject.

18 Claims, 11 Drawing Sheets

(56) References Cited

U.S. PATENT DOCUMENTS

| | | |
|---|---|---|
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,205,231 B1 | 3/2001 | Isadore-Barreca et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,068,842 B2 | 6/2006 | Liang et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,227,893 B1 | 6/2007 | Srinivasa et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,526,101 B2 | 4/2009 | Avidan |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |

(56) References Cited

U.S. PATENT DOCUMENTS

| | | | |
|---|---|---|---|
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,526,734 B2 * | 9/2013 | Al-Ghosien | H04N 13/0253 382/173 |
| 2003/0113018 A1 * | 6/2003 | Nefian et al. | 382/181 |
| 2003/0169906 A1 * | 9/2003 | Gokturk et al. | 382/115 |
| 2004/0239670 A1 * | 12/2004 | Marks | 345/419 |
| 2007/0110298 A1 * | 5/2007 | Graepel et al. | 382/154 |
| 2007/0285419 A1 * | 12/2007 | Givon | 345/420 |
| 2008/0026838 A1 | 1/2008 | Dunstan et al. | |
| 2008/0123968 A1 | 5/2008 | Nevatia et al. | |
| 2008/0181499 A1 | 7/2008 | Yang et al. | |
| 2008/0212836 A1 * | 9/2008 | Fujimura et al. | 382/103 |
| 2009/0010490 A1 | 1/2009 | Wang et al. | |
| 2009/0077504 A1 * | 3/2009 | Bell et al. | 715/863 |
| 2009/0169067 A1 | 7/2009 | Chang et al. | |
| 2009/0183125 A1 * | 7/2009 | Magal et al. | 715/863 |
| 2010/0034457 A1 * | 2/2010 | Berliner et al. | 382/154 |
| 2010/0151946 A1 * | 6/2010 | Wilson et al. | 463/36 |
| 2010/0183227 A1 | 7/2010 | Park et al. | |
| 2010/0197390 A1 | 8/2010 | Craig et al. | |
| 2010/0277470 A1 * | 11/2010 | Margolis | 345/419 |
| 2010/0302247 A1 * | 12/2010 | Perez | G06K 9/00201 345/440 |
| 2011/0069870 A1 | 3/2011 | Marais et al. | |
| 2011/0081044 A1 | 4/2011 | Peeper et al. | |
| 2011/0193939 A1 * | 8/2011 | Vassigh et al. | 348/46 |
| 2011/0292036 A1 * | 12/2011 | Sali et al. | 345/419 |
| 2011/0293137 A1 * | 12/2011 | Gurman et al. | 382/103 |
| 2012/0056800 A1 * | 3/2012 | Williams et al. | 345/156 |
| 2012/0139907 A1 * | 6/2012 | Lee | G06F 3/0304 345/419 |
| 2012/0314031 A1 * | 12/2012 | Shotton | H04N 13/0203 348/46 |
| 2014/0225886 A1 * | 8/2014 | Tremblay et al. | 345/419 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Park, Sangho et al., "Segmentation and Tracking of Interacting Human Body Parts under Occlusion and Shadowing," IEEE Workshop on Motion and Video Computing, Orlando, FL., Dec. 2002, 7 pages.

Kehl, Roland et al., "Full Body Tracking from Multiple Views Using Stochastic Sampling" IEEE Computer Society Conference on Computer Vision and Pattern Recognition, San Diego, CA., Jun. 2005, 8 pages.

Guan, et al., "Probabilistic 3D Occupancy Flow with Latent Silhouette Cues", Retrieved at <<http://iparla.inria.fr/publications/2010/GFBP10/cvpr2010.pdf>>, IEEE Conference on Computer Vision and Pattern Recognition, Aug. 5, 2010, pp. 1379-1386.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

(56) References Cited

OTHER PUBLICATIONS

"Simulation and Training", 1994, Division Incorporated.

* cited by examiner

THREE-DIMENSIONAL FOREGROUND SELECTION FOR VISION SYSTEM

BACKGROUND

A computer system may include a vision system to acquire video of a user, to determine the user's posture and/or gestures from the video, and to provide the posture and/or gestures as input to computer software. Providing input in this manner is especially attractive in video-game applications. The vision system may be configured to observe and decipher real-world postures and/or gestures corresponding to in-game actions, and thereby control the game. However, the task of determining a user's posture and/or gestures is not trivial; it requires a sophisticated combination of vision-system hardware and software. One of the challenges in this area is to accurately distinguish the user from a complex background.

SUMMARY

Accordingly, one embodiment of this disclosure provides a method for controlling a computer system. The method includes acquiring video of a subject, and obtaining from the video a time-resolved sequence of depth maps. An area targeting motion is selected from each depth map in the sequence. Then, a section of the depth map bounded by the area and lying in front of a plane is selected. The section of the depth map selected in this manner is used for fitting a geometric model of the subject.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 1:
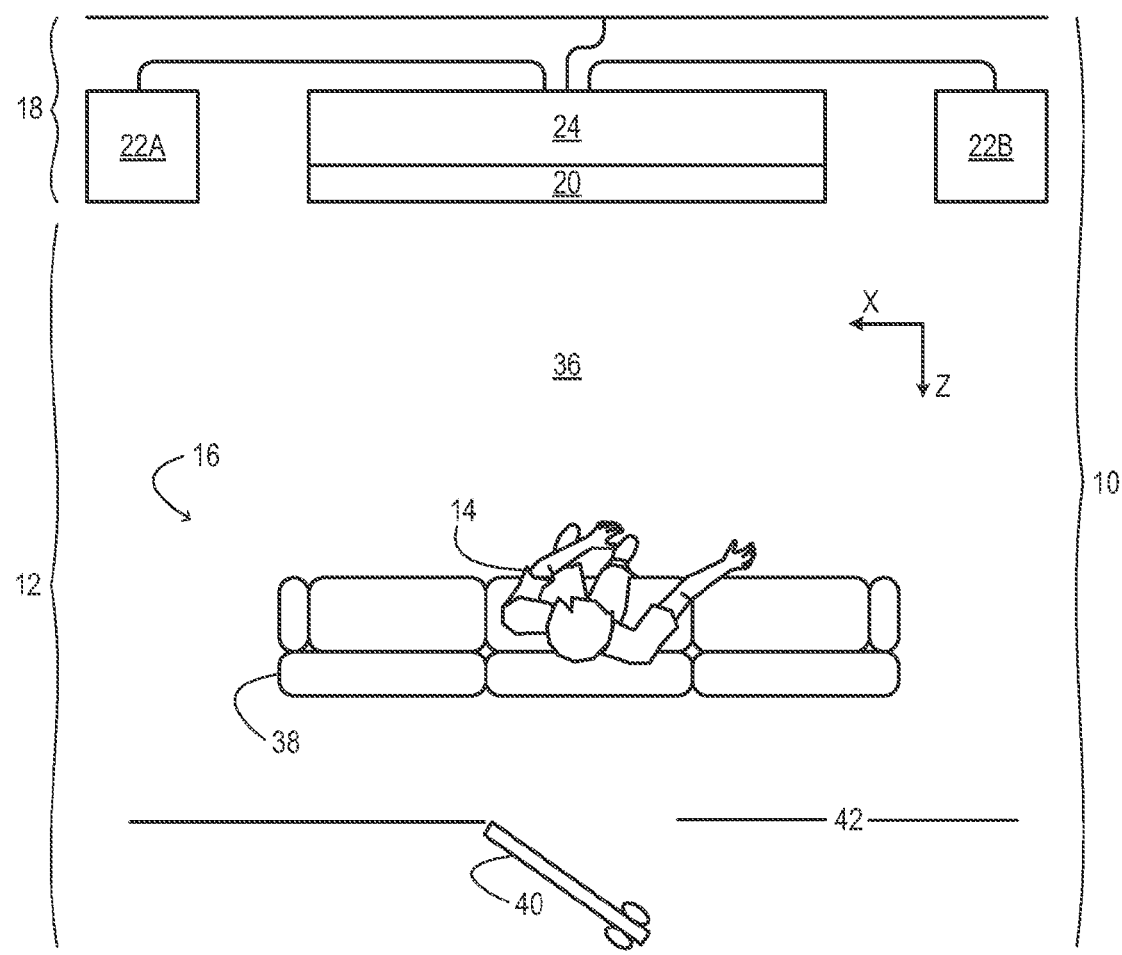
FIG. 1 shows aspects of an example imaging environment in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example imaging environment 10 from above. The imaging environment includes scene 12, comprising a subject 14 positioned in front of a background 16. The imaging environment also includes computer system 18, further illustrated in FIG. 2. In some embodiments, the computer system may be a interactive video-game system. Accordingly, the computer system as illustrated includes a high-definition, flat-screen display 20 and stereophonic loudspeakers 22A and 22B. Controller 24 is operatively coupled to the display and to the loudspeakers. The controller may be operatively coupled to other input and output componentry as well; such componentry may include a keyboard, pointing device, head-mounted display, or hand-held game controller, for example.

In some embodiments, computer system 18 may be a personal computer (PC) configured for other uses in addition to gaming. In still other embodiments, the computer system may be entirely unrelated to gaming; it may be furnished with input and output componentry appropriate for its intended use.

Figure 2:
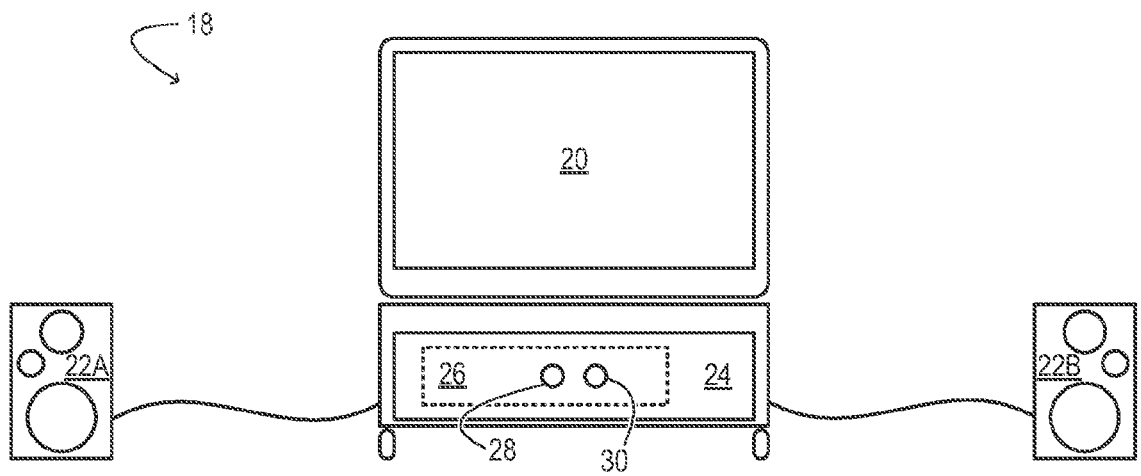
FIGS. 2 and 3 show aspects of an example computer system in accordance with an embodiment of this disclosure.

As shown in FIG. 2, controller 24 includes a vision system 26. Embodied in the hardware and software of the controller, the vision system is configured to acquire video of scene 12, and of subject 14 in particular. The vision system is further configured to process the acquired video to identify one or more postures and/or gestures of the subject, and to use such postures and/or gestures as input to an application or operating system running on controller 24. Accordingly, the vision system as illustrated includes cameras 28 and 30, arranged to acquire video of the scene.

The nature and number of the cameras may differ in the various embodiments of this disclosure. In general, one or both of the cameras may be configured to provide video from which a time-resolved sequence of depth maps may be obtained via downstream processing in vision system 26. As used herein, the term 'depth map' refers to an array of pixels registered to corresponding regions of an imaged scene, with a depth value of each pixel indicating the depth of the corresponding region. 'Depth' is defined as a coordinate parallel to the optical axis of the vision system, which increases with increasing distance from the vision system—e.g., the Z coordinate in the drawing figures.

In one embodiment, cameras 28 and 30 may be left and right cameras of a stereoscopic vision system. Time-resolved images from both cameras may be registered to each other and combined to yield depth-resolved video. In other embodiments, vision system 26 may be configured to project onto scene 12 a structured infrared illumination comprising numerous, discrete features (e.g., lines or dots). Camera 28 may be configured to image the structured illumination reflected from the scene. Based on the spacings between adjacent features in the various regions of the imaged scene, a depth map of the scene may be constructed.

In other embodiments, vision system 26 may be configured to project a pulsed infrared illumination onto the scene. Cameras 28 and 30 may be configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras. In still other embodiments, camera 28 may be a depth camera of any kind, and camera 30 may be a color camera. Time-resolved images from both cameras may be registered to each other and combined to yield depth-resolved color video.

Figure 3:
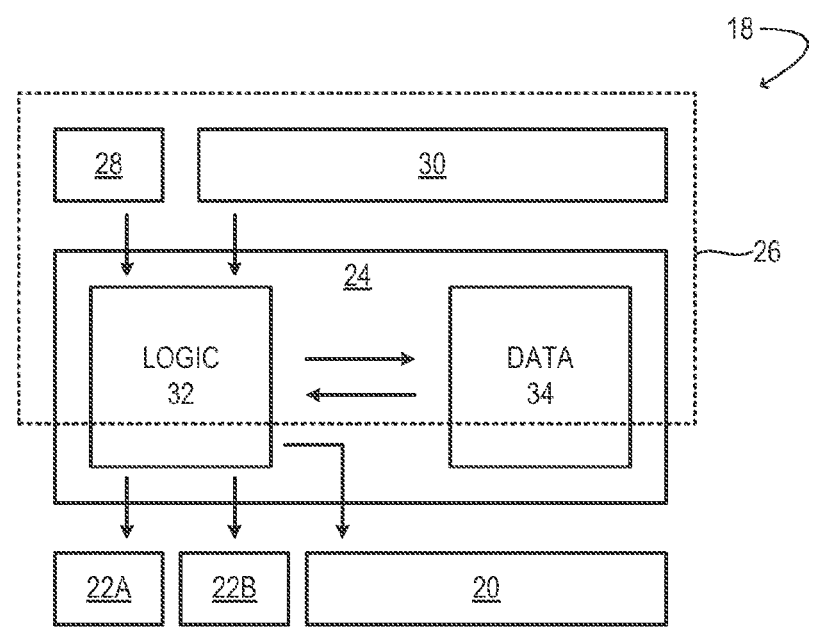

FIG. 3 illustrates still other aspects of computer system 18, controller 24, and vision system 26. This diagram schematically shows logic subsystem 32 and data subsystem 34, further described hereinafter. Through operative coupling between logic and data subsystems, the computer system with its input and output componentry may be configured to enact any method—e.g., data acquisition, computation, processing, or control function—described herein.

In some scenarios, as shown by example in FIG. 1, the background of an imaged scene may be complex. The background in the drawing includes floor 36, sofa 38, door 40, and wall 42. Naturally, the various background features, alone or in combination, may present contours that make the subject difficult to distinguish.

To address this issue while providing still other advantages, the present disclosure describes various methods in which background features are identified and removed, and a foreground is isolated. The methods are enabled by and described with continued reference to the above configurations. It will be understood, however, that the methods here described, and others fully within the scope of this disclosure, may be enabled by other configurations as well. The methods may be entered upon when computer system 18 is operating, and may be executed repeatedly. Naturally, each execution of a method may change the entry conditions for subsequent execution and thereby invoke a complex decision-making logic. Such logic is fully contemplated in this disclosure.

Some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used. Further, elements from a given method may, in some instances, be incorporated into another of the disclosed methods to yield other advantages.

Figure 4:
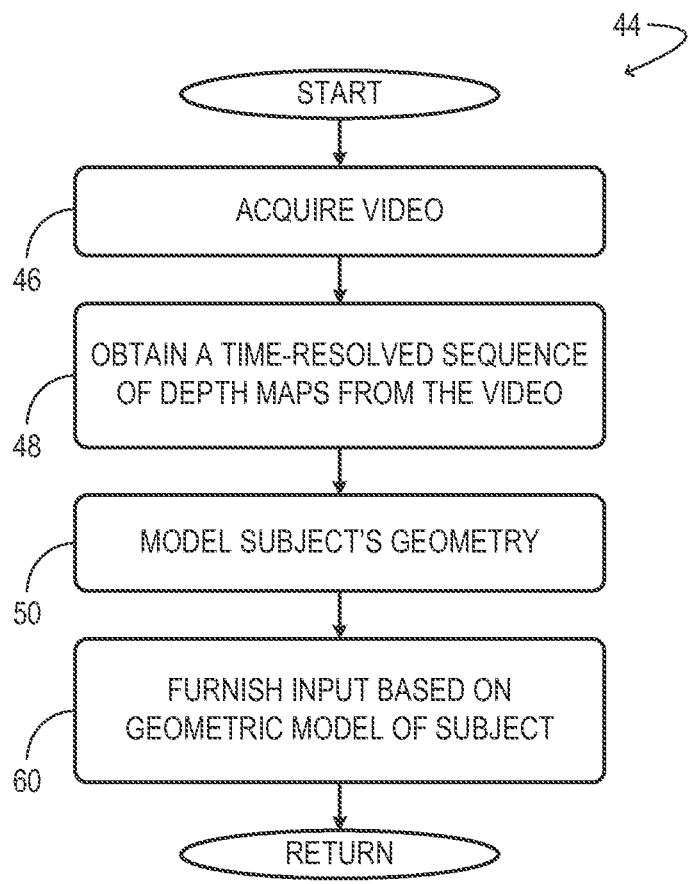
FIG. 4 illustrates an example method for controlling a computer system in accordance with an embodiment of this disclosure.

FIG. 4 illustrates an example high-level method 44 for controlling a computer system—e.g., a game system. At 46 of method 44, a vision system of the computer system acquires video of a scene that includes a subject in front of a background. In some instances, the subject may be a human subject or user of the computer system. In embodiments in which the computer system is a game system, the subject may be a sole player of the game system, or one of a plurality of players.

At 48 a time-resolved sequence of depth maps is obtained from the video, thereby providing time-resolved depth information from which the subject's postures and/or gestures may be determined. In one embodiment, the time-resolved sequence of depth maps may correspond to a sequence of frames of the video. It is equally contemplated, however, that a given depth map may include averaged or composite data from a plurality of adjacent frames of the video. Each depth map obtained in this manner will include an array of pixels, with depth information encoded in each pixel. In general, the pixel resolution of the depth map may be the same or different than that of the video from which it derives.

At 50 the subject's geometry is modeled based on at least one of the depth maps obtained at 48. The resulting geometric model provides a machine readable representation of the subject's posture. The geometric model may be constructed according to one or more of the methods described hereinafter, which include background removal and/or foreground selection, and skeletal fitting. This process can be better visualized with reference to the subsequent drawing figures.

Figure 5:
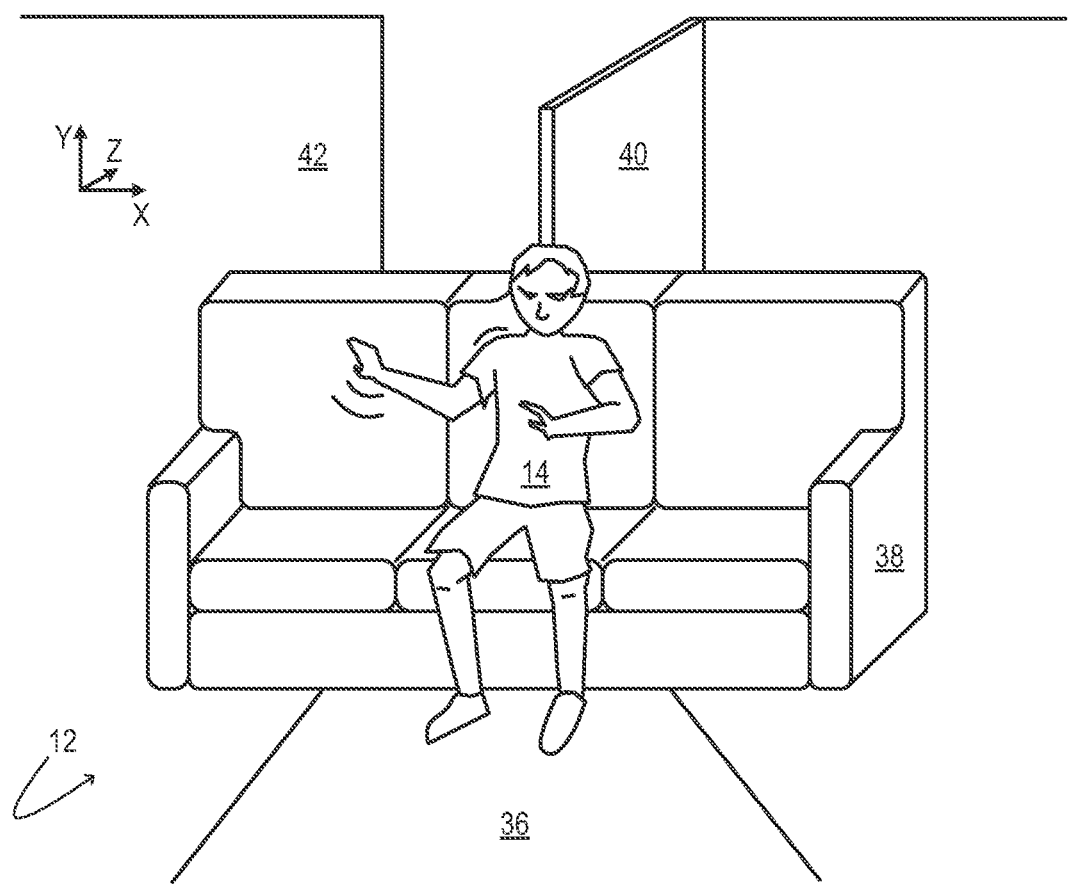
FIG. 5 shows aspects of an example scene and subject in accordance with an embodiment of this disclosure.
Figure 6:
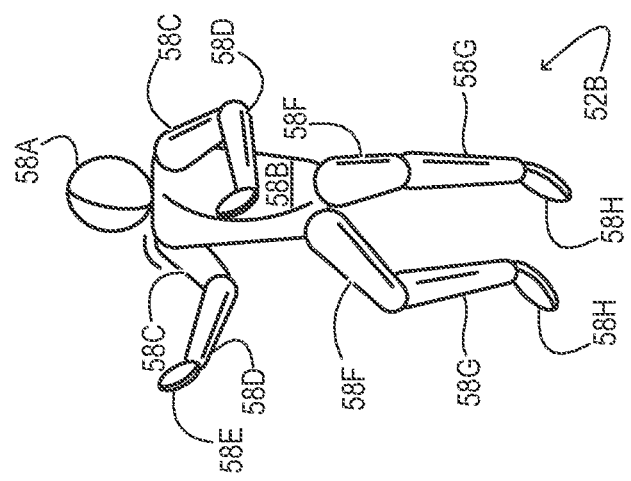
FIGS. 6 and 7 show aspects of example geometric models of subjects in accordance with embodiments of this disclosure.

FIG. 5 shows scene 12, including subject 14, from the perspective of vision system 26. FIG. 6 schematically shows an example geometric model 52A of the subject. The geometric model includes a skeleton 54 having a plurality of skeletal segments 54 pivotally coupled at a plurality of joints 56. In some embodiments, a body-part designation may be assigned to each skeletal segment and/or each joint at some stage of the modeling process (vide infra). In FIG. 6, the body-part designation of each skeletal segment 54 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 56 is represented by an appended letter: A for the neck, B for the shoulder, C for the elbow, D for the wrist, E for the lower back, F for the hip, G for the knee, and H for the ankle.

Naturally, the skeletal segments and joints shown in FIG. 6 are in no way limiting. A geometric model consistent with this disclosure may include virtually any number of skeletal segments and joints. In one embodiment, each joint may be associated with various parameters—e.g., Cartesian coordinates specifying joint position, angles specifying joint rotation, and additional parameters specifying a conformation of the corresponding body part (hand open, hand closed, etc.). The geometric model may take the form of a data structure including any or all of these parameters for each joint of the skeleton.

Figure 7:
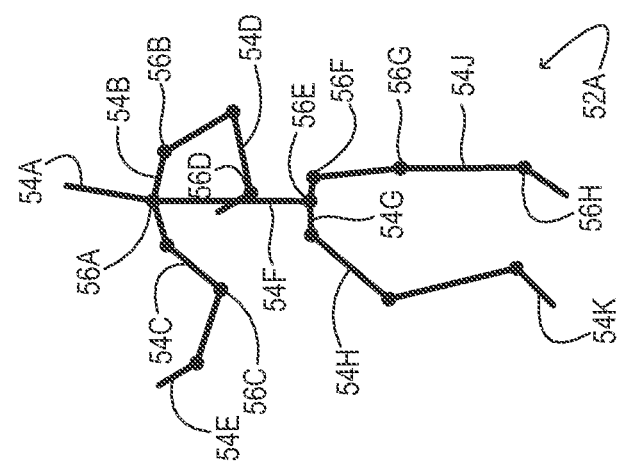

FIG. 7 shows a related geometric model 52B in which a geometric solid 58 is associated with each skeletal segment. Geometric solids suitable for such modeling are those that at least somewhat approximate in shape the various body parts of the subject. Example geometric solids include ellipsoids, polyhedra such as prisms, and frustra.

Returning to FIG. 4, at 60 an application or operating system of the computer system is furnished input based on the geometric model as constructed—viz., on the position or orientation of at least one skeletal segment or joint of the geometric model. For example, the position and orientation of the right forearm of the subject, as specified in the geometric model, may be provided as an input to application software running on the computer system. In some embodiments, the input may include the positions or orientations of all of the skeletal segments and/or joints of the geometric model, thereby providing a more complete survey of the subject's posture.

Figure 8:
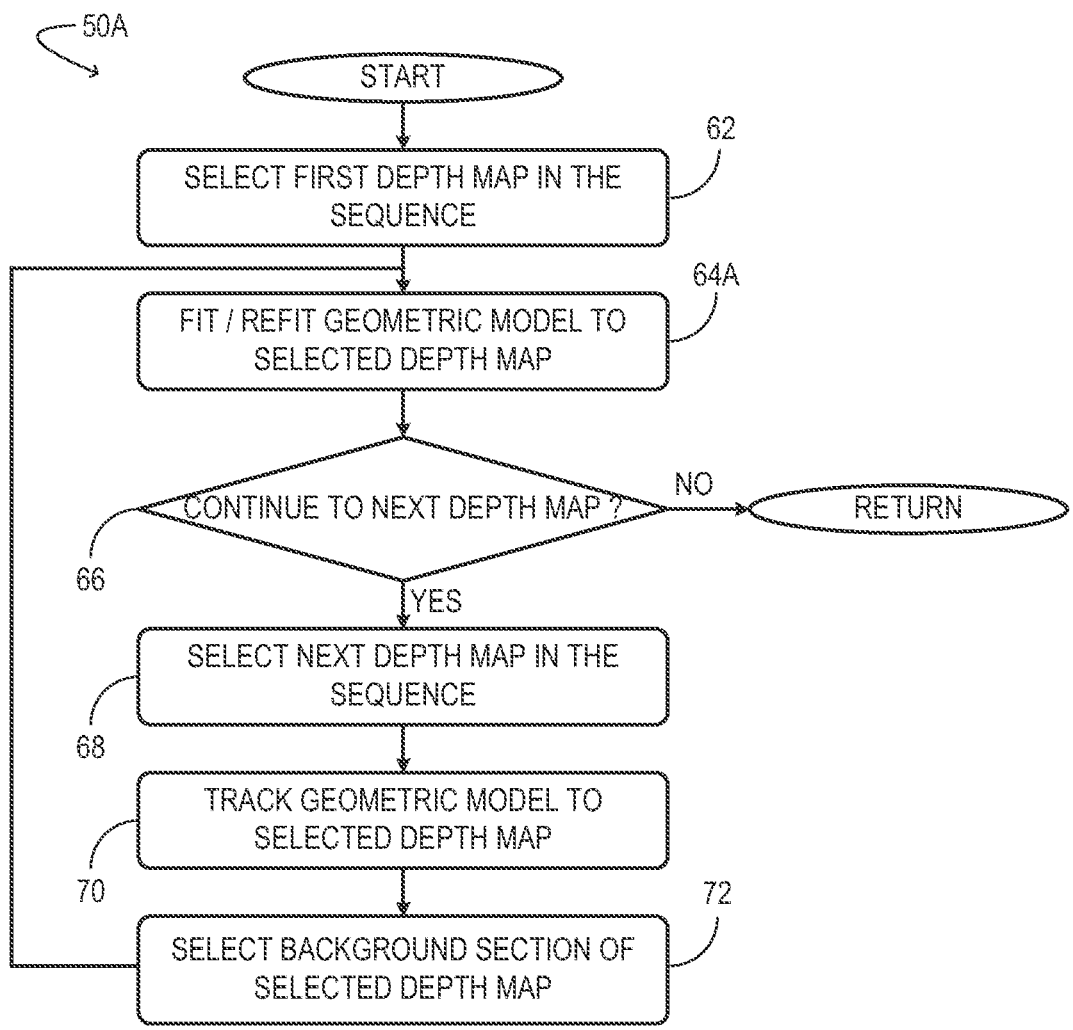
FIG. 8 illustrates an example method for modeling subject's geometry in accordance with an embodiment of this disclosure.

FIG. 8 illustrates an example method 50A for modeling the subject's geometry. This method may enacted, for instance, at step 50 of method 44. At 62 of method 50A, a first depth map in the time-resolved sequence of depth maps is selected. At 64A of method 50A, the skeletal segments and/or joints of the geometric model of the subject are fit to the selected depth map with a background section of the depth map excluded. In some embodiments, this action may determine the positions and other parameter values of the various joints of the geometric model. The background section may include pixels associated with floor 36, wall 42, or various other features that can be identified without prior modeling of the subject's geometry. At the outset of execution—i.e., for the first in the sequence of selected depth maps—the background section may include only such features.

Via any suitable minimization approach, the lengths of the skeletal segments and the positions of the joints of the geometric model may be optimized for agreement with the various contours of the selected depth map. In some embodiments, the act of fitting the skeletal segments may include assigning a body-part designation to a plurality of contours of the selected depth map. Optionally, the body-part designations may be assigned in advance of the minimization. As such, the fitting procedure may be informed by and based partly on the body-part designations. For example, a previously trained collection of geometric models may be used to label certain pixels from the selected depth map as belonging to a particular body part; a skeletal segment appropriate for that body part may then be fit to the labeled pixels. For example, if a given contour is designated as the head of the subject, then the fitting procedure may seek to fit to that contour a skeletal segment pivotally coupled to a single joint—viz., the neck. If the contour is designated as a forearm, then the fitting procedure may seek to fit a skeletal segment coupled to two joints—one at each end of the segment. Furthermore, if it is determined that a given contour is unlikely to correspond to any body part of the subject, then that contour may be masked or otherwise eliminated from subsequent skeletal fitting.

At 66 it is determined whether execution of method 50A will continue to the subsequent depth map or be abandoned. If it is determined that execution will continue, then the method advances to 68, where the next depth map in the sequence is selected; otherwise, the method returns.

Figure 9:
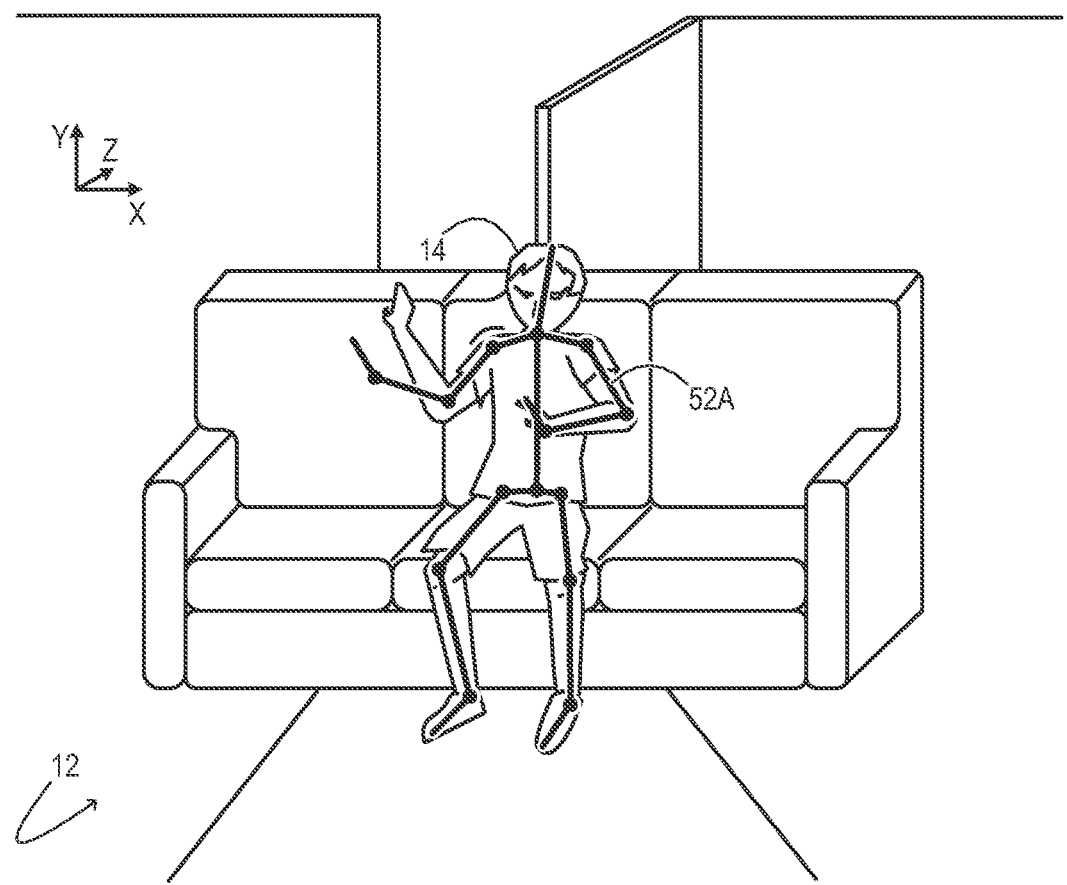
FIG. 9 shows the scene of FIG. 5 into which a geometric model is tracked in accordance with an embodiment of this disclosure.

At 70 of method 50A, the geometric model fit to the previous depth map in the sequence is tracked into the currently selected depth map. In other words, the coordinates of the joints and dimensions and orientations of the skeletal segments from the previous depth map are brought into registry with (i.e., registered to) the coordinates of the currently selected depth map. In some embodiments, this action may include extrapolating the coordinates forward into the currently selected depth map. In some embodiments, the extrapolation may be based on trajectories determined from a short sequence of previous depth maps. The result of this action is illustrated by example in FIG. 9, where scene 12 is again shown, with geometric model 52A tracked into scene 12 and superposed on subject 14.

In one embodiment, the time-resolved sequence of depth maps may be arranged in the natural order, with a given depth map in the sequence preceding one from a later frame of the video and following one from an earlier frame. This variant is appropriate for real-time processing of the video. In other embodiments, however, more complex processing schemes may be enacted, in which 'the previous depth map' may be obtained from a later frame of the video.

Returning to FIG. 8, at 72 of method 50A, a background section of the selected depth map is selected. The background section is one lacking coherent motion and located more than a threshold distance from the coordinates of the geometric model tracked into the selected depth map. At this stage of execution, regions—e.g., pixels—of the background section may be preselected based on a lack of coherent motion. In other words, regions that are static or exhibit only random, non-correlated motion may be preselected. Testing for correlation may help prevent a moving background region from being erroneously appended to the subject. Nevertheless, in other embodiments, only static regions may be preselected. In some embodiments, regions exhibiting less than a threshold amount of motion or moving for less than a threshold number of frames of the video may be preselected. To enact such preselection, depth values or contour gradients from regions of the selected depth map may be compared to those of one or more previous and/or subsequent depth maps in the sequence.

Regions preselected as lacking coherent motion are also examined for proximity to the tracked-in geometric model. In some embodiments, each preselected pixel located deeper—e.g., deeper at all or deeper by a threshold amount—than any skeletal segment of the tracked-in geometric model may be selected as a background pixel. In other embodiments, each preselected pixel located exterior to the geometric model—e.g., exterior at all or exterior by more than a threshold amount—may be selected as a background pixel. In other embodiments, a plane may be positioned with reference to one or more joints or skeletal segments of the geometric model—e.g., the plane may pass through three of the joints, through one joint and one skeletal segment, etc. Each preselected pixel located on the distal side of that plane—i.e., opposite the geometric model—may be selected as a background pixel. In some embodiments, each pixel of the background section of the depth map may be labeled as a background pixel in the appropriate data structure.

The embodiments above describe preselection of background regions based on lack of coherent motion, followed by a confirmation stage in which only those preselected pixels too far away from the geometric model are selected as belonging to the background section. However, the opposite sequence is equally contemplated—i.e., preselection based on distance from the geometric model, followed by confirmation based on lack of coherent motion. In still other embodiments, coherent motion and distance from the skeleton may be assessed together, pixel by pixel.

In some embodiments, selection of the background section at 72 may include execution of a floor- or wall-finding procedure, which locates floor 36 or wall 42 and includes these regions in the background section.

Continuing in FIG. 8, from 72 method 50A returns to 64A, where the skeletal segments and/or joints of the geometric model are refit to the currently selected depth map—i.e., the second, third, fourth depth map, etc.—with the background section excluded. This process may occur substantially as described above; however, the excluded background section will now include not only the features that could be identified without reference to the subject's geometry, but also those regions lacking coherent motion and located more than a threshold distance from the tracked-in geometric model.

Figure 10:
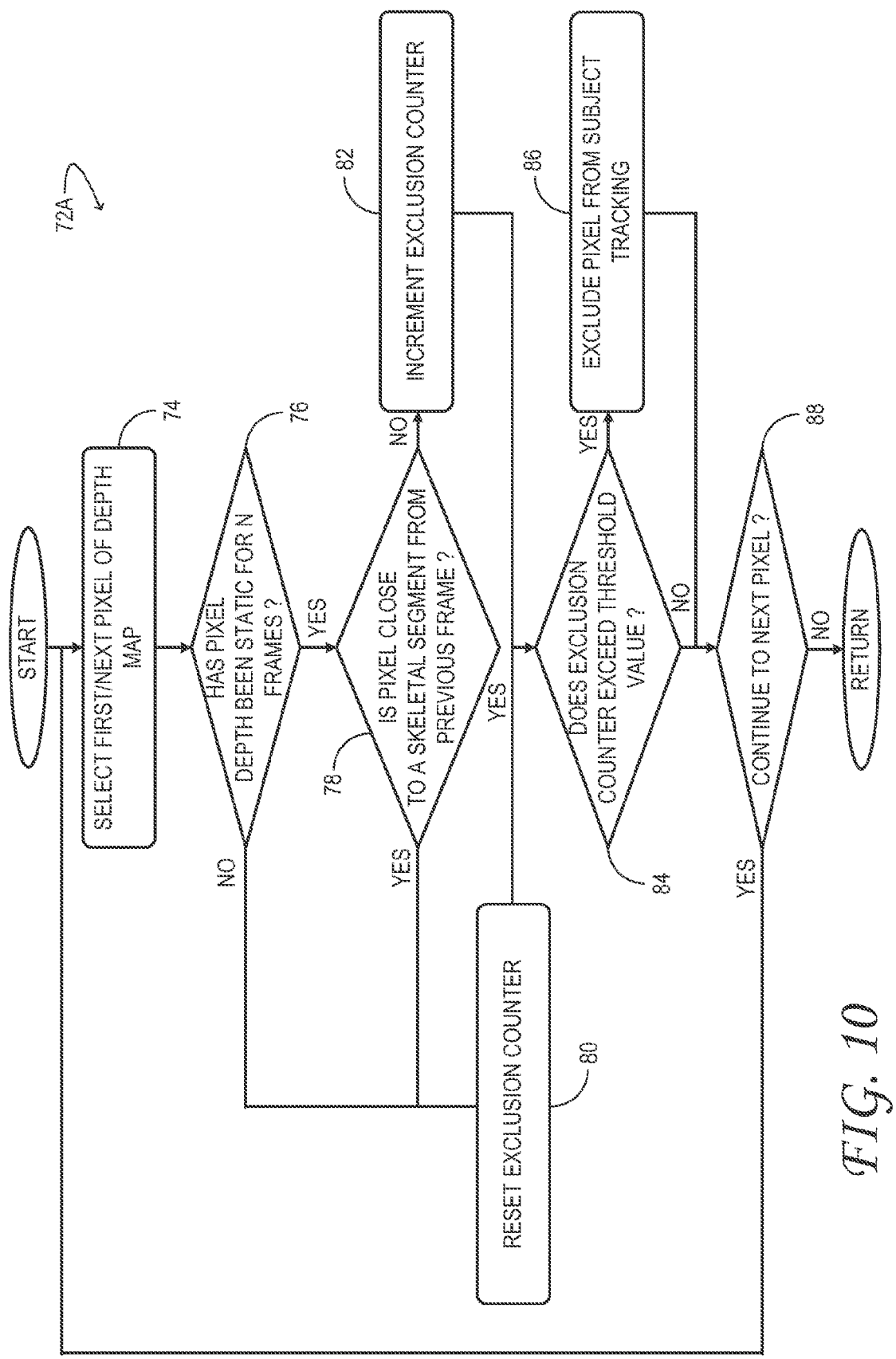
FIG. 10 illustrates an example method for selecting a background section of a depth map in accordance with an embodiment of this disclosure.

FIG. 10 illustrates a more particular example method 72A for selecting the background section of a depth map. This method may enacted, for instance, at 72 of method 50A. At 74 of method 72A, a pixel from the selected depth map is selected. At the outset of execution, the selected pixel may be the first pixel encoded in the depth map. During subsequent execution, the selected pixel may be the next pixel—e.g., the second, third, fourth pixel, etc. At 76 it is determined whether the depth of the selected pixel has been static—e.g., has undergone less than a threshold change—for a predetermined number n of depth maps. If the pixel depth has been static for n depth maps, then the method advances to 78; otherwise, the method advances to 80.

At 78 it is determined whether the selected pixel is within a threshold distance of a skeletal segment or joint of the geometric model tracked in from a previous depth map in the sequence. If the pixel is not within a threshold distance of any such feature, then the method advances to 82, where an exclusion counter corresponding to that pixel is incremented. Otherwise, the method advances to 80, where the exclusion counter is reset. From 82 or 80, the method advances to 84, where it is determined whether the exclusion counter exceeds a threshold value. If the exclusion counter exceeds the threshold value, then the method advances to 86, where that pixel is selected as background and excluded from consideration when fitting the geometric model of the subject. However, if the exclusion counter does not exceed the threshold value, then the pixel is retained for model fitting, and the method advances to 88.

At 88 it is determined whether to continue to the next pixel. If yes, then the method loops back to 74; otherwise the method returns. In this manner, only those pixels for which the corresponding exclusion counter is above a threshold value are included in the background section.

Figure 11:
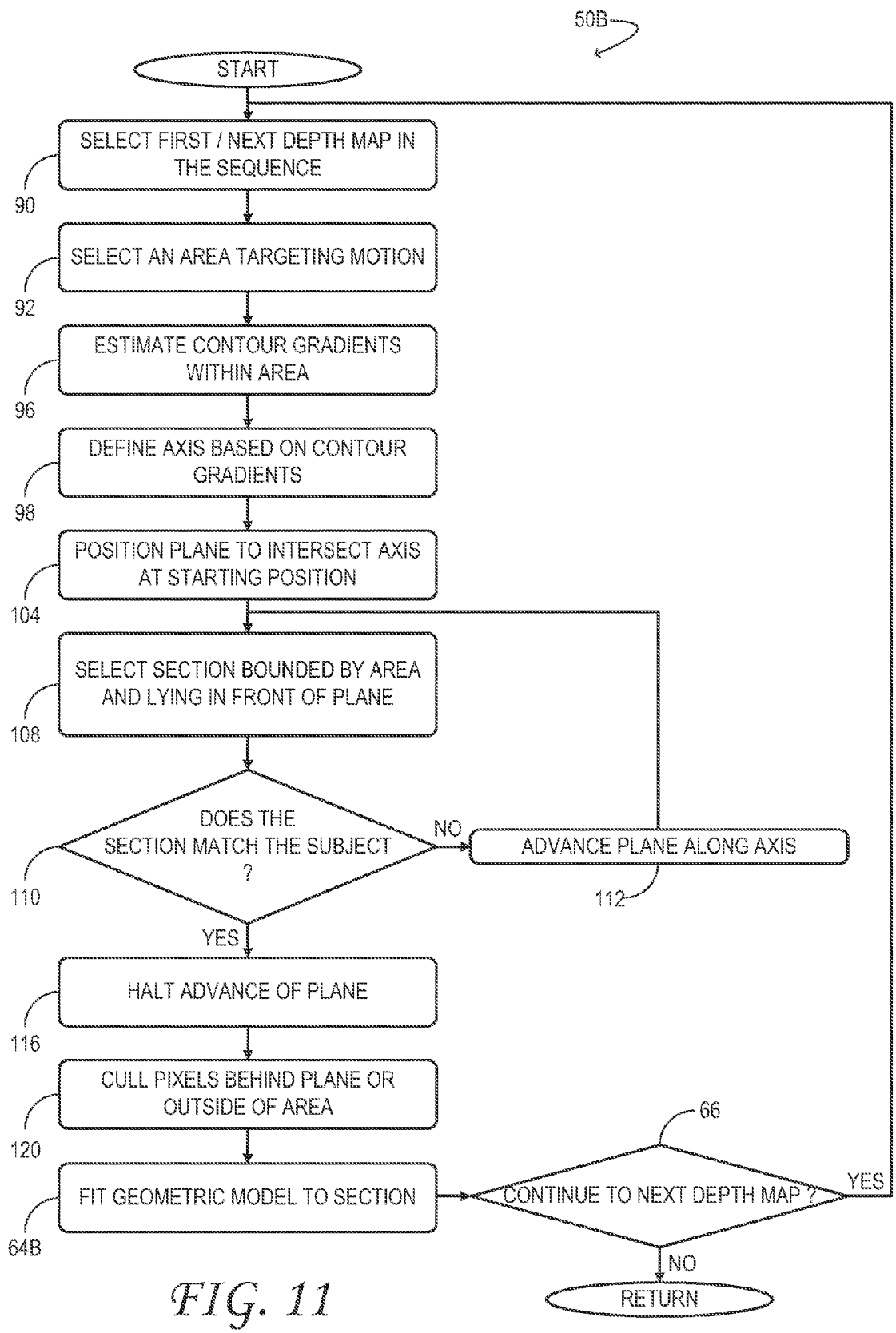
FIG. 11 illustrates another example method for modeling subject's geometry in accordance with an embodiment of this disclosure.

FIG. 11 illustrates another example method 50B for modeling the subject's geometry. This method may enacted, for instance, at step 50 of method 44. At 90 of method 50B, a depth map in the time-resolved sequence of depth maps is selected. At the outset of execution, the depth map selected may be the first depth map in the time-resolved sequence. During subsequent execution, the selected depth map may be the next depth map—e.g., the second, third, fourth depth map, etc.

Figure 12:
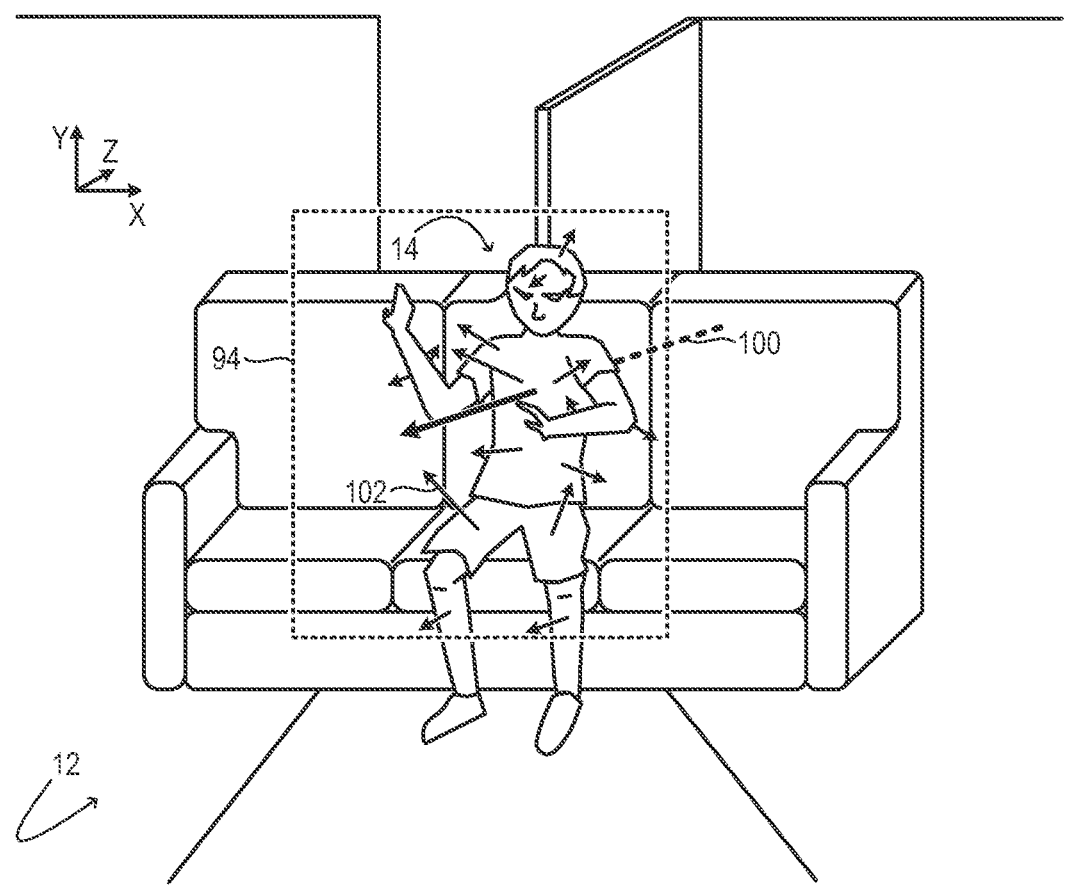
FIGS. 12 and 13 show aspects of an example scene and subject in accordance with an embodiment of this disclosure.

At 92 an area of the selected depth map is selected for further processing. The selected area is one that targets motion in the depth map. In other words, the area encloses a moving contour of the depth map, and it excludes at least some region or contour that is not moving. An example area 94 that targets motion in example scene 12 is shown in FIG. 12. In this example, the area is a rectangle in a two-dimensional domain of the depth map. Accordingly, the area may define a rectangular box open at two, opposite ends and having four closed faces and four edges all parallel to the depth coordinate. This example is not intended to be limiting, however, as areas of other shapes may be selected instead.

Area 94 may be selected by comparing depth values or contour gradients from the selected depth map to those of one or more previous and/or subsequent depth maps in the sequence. In one embodiment, any locus of motion above a threshold amount may qualify as motion and be enclosed by the area. In another embodiment, any locus of motion that has been moving longer than a threshold number of frames may qualify as motion and be enclosed by the area. In other embodiments, only loci of coherent motion may be enclosed by the area; loci of random, non-correlated motion may be excluded from the area. This optional approach may help prevent a moving background from being erroneously appended to the subject.

At 96 of method 50B, one or more contour gradients within the enclosed area are estimated based on the depth map. This action may include computing the contour gradient for each of a plurality of points within the area—e.g., all points, points of extreme depth, points of extreme motion, a random sampling of points, etc. In one particular embodiment, triads of mutually adjacent points within the area may define a plurality of plane triangles; a contour gradient may be computed for each of the triangles.

At 98 an axis is defined based on the one or more contour gradients. One example result of this approach is illustrated in FIG. 12. The drawing is intended to illustrate that axis 100 is parallel to an average surface normal of the one or more contour gradients 102. In cases where the contour gradient is computed at random sampling of points within the area, the act of averaging the contour gradients together will weight the subject's torso more highly than the arms, legs, or other features, because the torso occupies a large area on the depth map. Accordingly, the axis may naturally point in the direction that the subject is facing.

In other embodiments, information from a geometric model fit to a previous depth map in the sequence may be used to weight one contour gradient more heavily than another, and thereby influence the orientation of the axis. For example, a geometric model may be available that, once tracked into the current depth map, assigns a given contour in the area to the subject's torso. At 98, the axis may be defined based largely or exclusively on the contour gradients of the torso, so that the axis points in the direction that the subject is facing.

Figure 13:
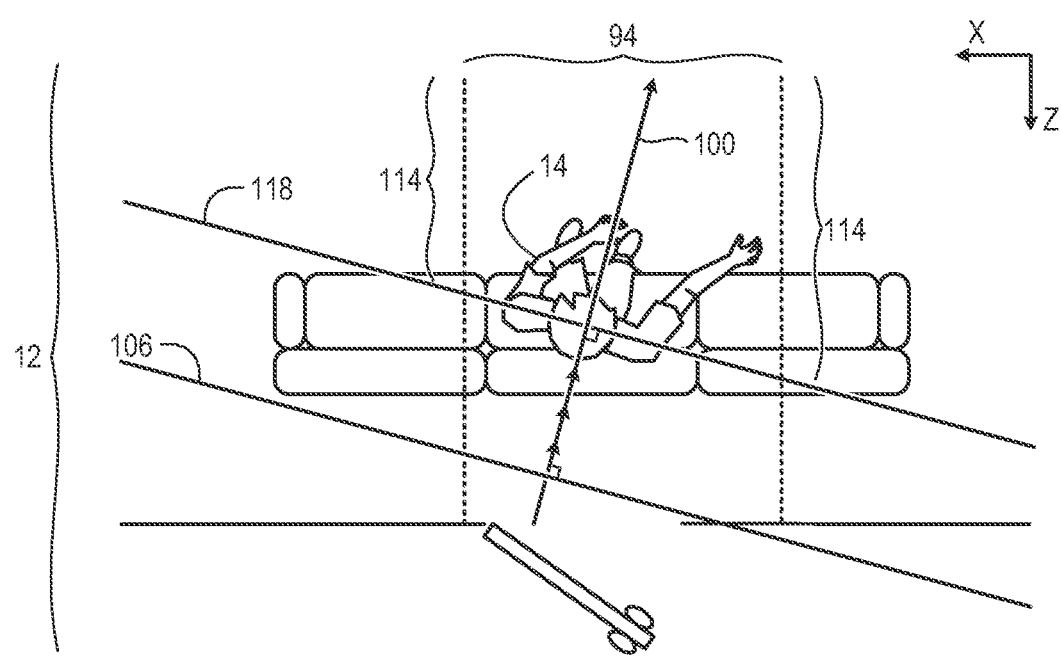

At 104 a plane oriented normal to the axis is positioned to initially intersect the axis at a starting position. One example of this approach is illustrated in FIG. 13, where 106 denotes the starting position of the plane. In some embodiments, the starting position may be determined based on the orientation of the axis and on estimated dimensions of the subject. For example, the starting position may be located along the axis and behind the subject by an appropriate margin. In one example, where the subject is a human subject, the starting position may be located one to two meters behind a nearest depth value within the area. It will be understood that the numerical ranges recited in this disclosure are given by way of example, as other ranges are equally contemplated.

At 108, for each position of the plane, a section of the depth map bounded by the area and lying in front of the plane is selected. At 110 it is determined whether the section matches, or sufficiently resembles, the subject. In embodiments in which the subject is a human subject, this determination may include assessing whether the various contours of the section, taken as a whole, resemble a human being. To this end, the section may be projected onto the two-dimensional surface of the plane and compared to each of a series of stored silhouettes of human beings in various postures. In other embodiments, the determination may include assessing how much of the section is assignable to the subject. A match may be indicated when a threshold fraction of the section (e.g., 90% of the pixels) are assignable to the subject.

Continuing at 110, if it is determined that the section does not match the subject, then the method continues to 112, where the plane is advanced along the axis, prior to repeated selection at 108 and determination at 110. FIG. 13 shows an example section 114 selected in this manner. In one embodiment, the plane may be advanced by regular intervals, such as intervals of two centimeters or less. In other embodiments, different intervals—smaller or larger—may be used. When the section does match the subject, then, at 116, advance of the plane is halted. In FIG. 13, the position at which the advance of the plane is halted is shown at 118.

At 120, the pixels behind the plane or outside of the area are culled—i.e., excluded from the section. In some embodiments, such pixels are labeled as background pixels in the appropriate data structure.

At 64B, the skeletal segments and/or joints of the geometric model of the subject are fit to the selected section of the selected depth map. The fitting may be enacted substantially as described for 64A above; however, only the selected section is submitted for fitting. Accordingly, the regions located outside of the defined area or behind the defined plane, being excluded from the section, are also excluded from the fitting. At 66 it is determined whether to continue execution to next depth map in the sequence. If execution is continued, then the method returns to 90.

In some variants of method 50B, the plane may be positioned differently. In some embodiments, information from a geometric model fit to a previous depth map in the sequence may be used to position the axis and/or plane. For example, a geometric model may be available that, once tracked into the current depth map, assigns a given contour in the area to the subject's head or shoulders. Accordingly, the plane may be positioned immediately above a contour assigned as the head of the subject to cull the background above the head. Similarly, the plane may be positioned immediately behind a contour assigned as the shoulders of the subject to cull the background behind the shoulders.

As noted above, the general approach of method 50B is consistent with processing schemes in which the subject, located and modeled in one depth map, is tracked into subsequent depth maps of the sequence. Accordingly, the determination of whether or not to advance the plane (110 in method 50B) may be based on whether appropriate tracking criteria are met. In other words, when the currently selected section defines the subject well enough to allow tracking into the next frame, then advance of the plane may be halted. Otherwise, the plane may be advanced to provide more culling of potential background pixels behind the subject. However, it is also possible that continued advance of the plane could result in the subject being degraded, so that tracking into the next frame is not possible. In that event, a fresh attempt to locate the subject may be made starting with the next depth map in the sequence.

The approaches described herein provide various benefits. In the first place, they reduce the number of pixels to be interrogated when fitting the geometric model of the subject. This enables faster or more accurate fitting without increasing memory and/or processor usage. Second, they involve very little computational overhead, as background pixels are culled based on the coordinates of the same geometric model used to provide input, as opposed to an independently generated background model.

As noted above, the methods and functions described herein may be enacted via computer system 18, shown schematically in FIG. 3. More specifically, data subsystem 34 may hold instructions that cause logic subsystem 32 to enact the various methods. To this end, the logic subsystem may include one or more physical devices configured to execute instructions. The logic subsystem may be configured to execute instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors configured to execute software instructions. Additionally or alternatively, the logic subsystem may include one or more hardware or firmware logic machines configured to execute hardware or firmware instructions. The logic subsystem may optionally include components distributed among two or more devices, which may be remotely located in some embodiments.

Data subsystem 34 may include one or more physical, non-transitory devices configured to hold data and/or instructions executable by logic subsystem 32 to implement the methods and functions described herein. When such methods and functions are implemented, the state of the data subsystem may be transformed (e.g., to hold different data). The data subsystem may include removable media and/or built-in devices. The data subsystem may include optical memory devices, semiconductor memory devices, and/or magnetic memory devices, among others. The data subsystem may include devices with one or more of the following characteristics: volatile, nonvolatile, dynamic, static, read/write, read-only, random access, sequential access, location addressable, file addressable, and content addressable. In one embodiment, the logic subsystem and the data subsystem may be integrated into one or more common devices, such as an application-specific integrated circuit (ASIC) or so-called system-on-a-chip. In another embodiment, the data subsystem may include computer-system readable removable media, which may be used to store and/or transfer data and/or instructions executable to implement the herein-described methods and processes.

The terms 'module' and/or 'engine' are used to describe an aspect of computer system 18 that is implemented to perform one or more particular functions. In some cases, such a module or engine may be instantiated via logic subsystem 32 executing instructions held by data subsystem 34. It will be understood that different modules and/or engines may be instantiated from the same application, code block, object, routine, and/or function. Likewise, the same module and/or engine may be instantiated by different applications, code blocks, objects, routines, and/or functions in some cases.

As shown in FIG. 3, computer system 18 may include components of a user interface, such as display 20. The display may provide a visual representation of data held by data subsystem 34. As the herein-described methods and processes change the data held by the data subsystem, and thus transform the state of the data subsystem, the state of the display may likewise be transformed to visually represent changes in the underlying data. The display may include one or more display devices utilizing virtually any type of technology. Such display devices may be combined with logic subsystem 32 and/or data subsystem 34 in a shared enclosure, or such display devices may be peripheral display devices.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method for controlling a computer system, the method comprising:
   acquiring video of a subject in front of a background;

obtaining from the video a time-resolved sequence of depth maps;

enacting area-wise motion detection on the sequence of depth maps to select from a depth map an area enclosing a moving contour, excluding a non-moving contour, and thereby targeting motion;

defining an axis parallel to an average surface normal of one or more contour gradients within the area;

selecting as foreground a section of the depth map bounded by the area and lying in front of a plane normal to that axis, and associating with the background, pixels of the depth map located behind the plane or outside the area; and fitting a geometric model of the subject to the section selected as the foreground.

2. The method of claim 1 wherein acquiring the video comprises acquiring with a depth camera.

3. The method of claim 1 wherein the motion targeted is a coherent motion.

4. The method of claim 1 wherein the subject is a human subject or user of the computer system.

5. The method of claim 1 wherein selecting the section includes positioning the plane to intersect the axis at a starting position and advancing the plane along the axis, wherein a section bounded by the area and lying in front of the plane is selected for each position of the plane.

6. The method of claim 5 further comprising halting advance of the plane when the section sufficiently resembles the subject.

7. The method of claim 5 wherein the starting position is determined based on estimated dimensions of the subject.

8. The method of claim 1 wherein the axis is oriented in a direction that the subject is facing.

9. The method of claim 1 further comprising assigning a body-part designation to a contour inside the area, wherein defining the axis comprises defining based on the contour to which the body-part designation is assigned.

10. The method of claim 9 wherein the body-part designation assigns the contour as a head of the subject, and wherein the plane is positioned immediately above the contour.

11. The method of claim 9 wherein the body-part designation assigns the contour as a shoulder of the subject, and wherein the plane is positioned immediately behind the contour.

12. The method of claim 1 further comprising furnishing input in the computer system based on a position or orientation of at least one skeletal segment of the geometric model.

13. A method for controlling a computer system, the method comprising:

acquiring video of a subject in front of a background;

obtaining from the video a time-resolved sequence of depth maps;

selecting from a depth map in the sequence an area targeting motion;

defining an axis parallel to an average surface normal of one or more contour gradients within the area, the axis oriented in a direction that a torso of the subject is facing;

positioning a plane to intersect the axis at a starting position determined based on estimated dimensions of the subject;

advancing the plane along the axis;

for each position of the plane, selecting as foreground a section bounded by the area and lying in front of the plane;

halting advance of the plane when the section sufficiently resembles the subject;

associating with the background, pixels of the depth map located behind the plane or outside the area; and fitting a geometric model of the subject to the section selected as the foreground.

14. The method of claim 13 wherein the area is a rectangle in a two-dimensional domain of the depth map, the area defining a rectangular box open at two, opposite ends and having four closed faces and four edges all parallel to a depth coordinate.

15. The method of claim 13 wherein the starting position is one to two meters behind a nearest depth value within the area, and wherein advancing the plane includes advancing by intervals of two centimeters or less.

16. The method of claim 13 wherein the area encloses a moving contour and excludes a non-moving contour and is selected based on area-wise motion detection on the sequence of depth maps.

17. A system comprising:

a vision subsystem configured to obtain from a depth camera a sequence of time-resolved depth maps imaging a human subject;

a logic subsystem operatively coupled to the vision subsystem; and a data subsystem holding instructions executable by the logic subsystem to:

based on area-wise motion detection on the sequence of depth maps, identify in a depth map an area enclosing a moving contour and excluding a non-moving contour;

based on contour analysis inside the area, identify a direction that a torso of the subject is facing, the direction being parallel to an average surface normal of one or more contour gradients within the area;

select as foreground a section of the depth map bounded by the area and lying in front of a plane normal to the direction, and associate with the background, pixels of the depth map located behind the plane or outside the area, and fit a geometric model of the subject to the section selected as the foreground.

18. The system of claim 17 wherein the vision subsystem is configured to project pulsed illumination, or discrete illumination features, onto the subject, and wherein the depth camera is configured to resolve a time-of-flight of the pulsed illumination, or a spacing between the discrete illumination features, respectively.

* * * * *